United States Patent [19]
Wellinitz

[11] 3,815,360
[45] June 11, 1974

[54] COMBINED INFRARED AND SOUND SUPPRESSOR FOR AIRCRAFT JET ENGINE

[75] Inventor: Jerry N. Wellinitz, La Mesa, Calif.

[73] Assignee: Rohr Industries, Inc., Chula Vista, Calif.

[22] Filed: Apr. 16, 1971

[21] Appl. No.: 134,678

[52] U.S. Cl. .................... 60/264, 60/39.5, 60/265, 60/271, 181/33 HC, 181/67, 239/265.17
[51] Int. Cl. .......................................... F02k 1/26
[58] Field of Search ............ 60/264, 271, 263, 265, 60/39.5; 181/33 HC, 67; 239/127.3, 265.17

[56] References Cited
UNITED STATES PATENTS

| | | | |
|---|---|---|---|
| 2,944,623 | 7/1960 | Bopine | 60/264 |
| 3,210,934 | 10/1965 | Smale | 60/265 |
| 3,550,721 | 12/1970 | Bruner | 239/127.3 |
| 3,631,678 | 1/1972 | Reed | 60/264 |

FOREIGN PATENTS OR APPLICATIONS

| | | | |
|---|---|---|---|
| 829,012 | 2/1960 | Great Britain | 181/67 |
| 125,775 | 4/1919 | Great Britain | 181/33 HC |

Primary Examiner—Carlton R. Croyle
Assistant Examiner—Warren Olsen

[57] ABSTRACT

For reducing line-of-sight, infrared radiation and exhaust noise from the tailpipe of a jet aircraft engine, a plurality of hollow helical vanes with porous walls and supplied internally with pressurized coolant fluid are mounted co-axially and in symmetrically distributed arrangement, within a hollow tailpipe, the inner wall of which is also porous. Each vane has circumferential extent within the tailpipe sufficient to completely mask line-of-sight exposure into the engine from any point aft of the plane of the exit end of the tailpipe and to provide acoustic baffling and swirl for external mixing. Where the engine has an axial tail cone or bullet, the inner edges of the vanes may define a hollow axial core equal in diameter to the bullet.

8 Claims, 3 Drawing Figures

PATENTED JUN 11 1974  3,815,360

INVENTOR.
JERRY N. WELLNITZ
BY
George E. Pearson
ATTORNEY

COMBINED INFRARED AND SOUND SUPPRESSOR FOR AIRCRAFT JET ENGINE

BACKGROUND OF THE INVENTION

Prior attempts have been made to seal off the rearward, infrared signature of jet engines, for example those used in helicopters. Such prior attempts include the mounting of a plug in the tailpipe of the engine, some of which plugs have been made of porous, nonstructural material such as felt metal or wire mesh, and the interior of the plugs supplied with pressurized air for cooling.

One such prior concept is disclosed in an article in "Proceedings of the Sixth Symposium on Infrared Countermeasures," (Secret), April 1967, pp. 168 – 169. Also, line-of-sight cut-offs have been proposed employing a jacketed tailpipe with an axially twisted, hollow, cross shape segment fitted therein. Also, an uncooled muffler for a reciprocating piston type engine and having a helically twisted vane therein is shown in U. S. Pat. No. 2,300,130. However, such prior efforts have failed to provide a completely satisfactory infrared masking device, and have had less than fully adequate sound suppressing effect.

SUMMARY OF THE INVENTION

The primary objective of the present invention is to achieve infrared radiation suppression by providing a jet engine tailpipe having an impervious outer wall, a porous, spaced inner wall, and a plurality of hollow, helical, porous, heat shield vanes mounted co-axially in the tailpipe. The pitch and radial extent of the helical vanes are sufficient to mask line-of-sight vision into the engine from any point aft of the exit end of the tailpipe, and pressurized coolant fluid, such as ambient air, is supplied to the hollow interiors of the tailpipe and vanes for transpiration through, and flow along the porous skin of these members. The swirl imparted to the exhaust flow also provides rapid mixing and dispersal of the exhaust plume as it exits from the tailpipe, thereby reducing the residual infrared signal of the external plume itself.

A secondary objective of the invention is to achieve significant suppression of jet and engine noise. The porous tailpipe wall and hollow vanes serve as sound baffles for engine noise, and the swirl imparted to the exhaust flow reduces the noise created by shearing impact with the ambient air.

BRIEF DESCRIPTION OF THE DRAWINGS

The foregoing objectives and advantages of the invention will be apparent from the following description and the accompanying drawings, wherein.

DETAILED DESCRIPTION OF THE DRAWINGS

Figure 1:
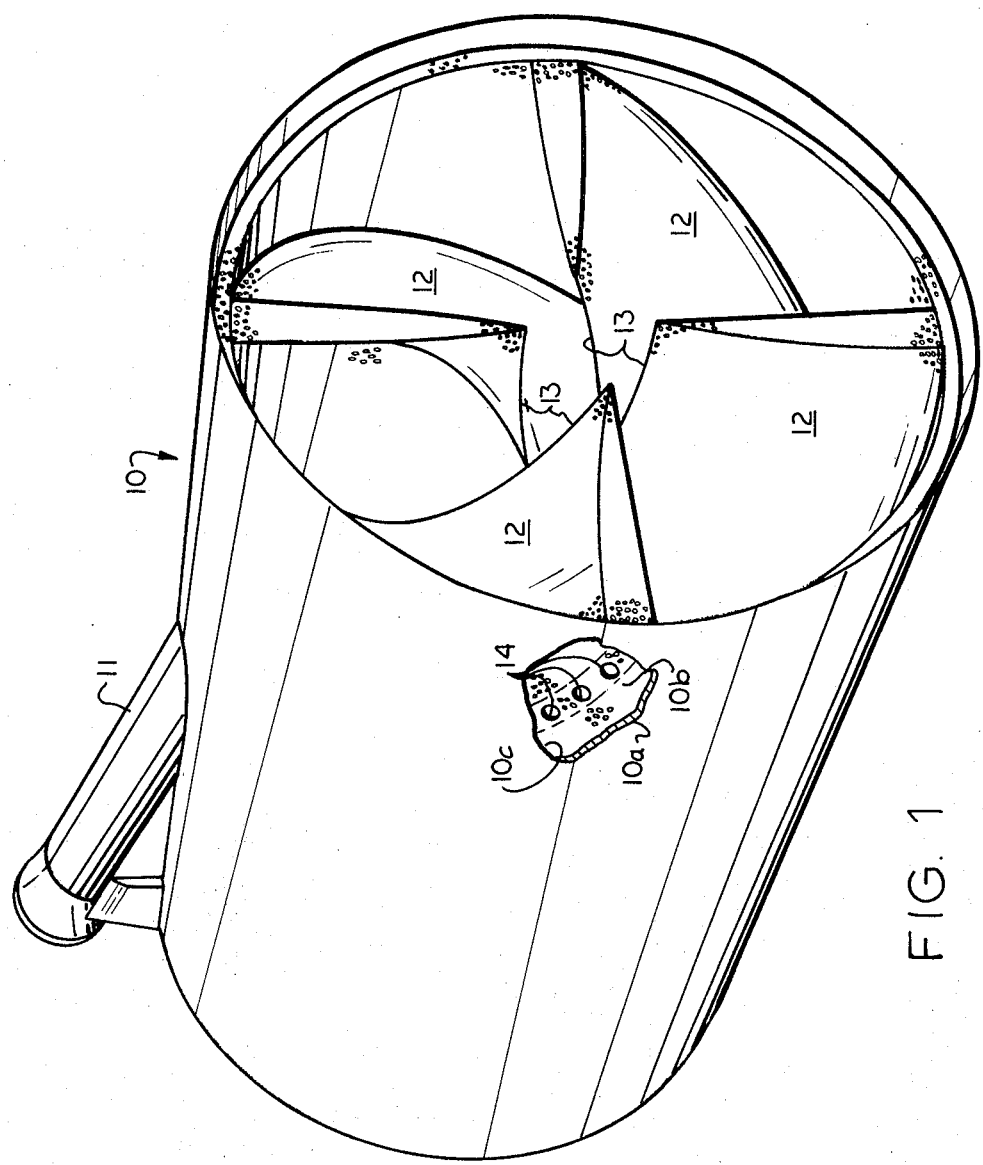
FIG. 1 is a perspective view looking into the discharge end of a tailpipe embodying the invention as the tailpipe appears when removed from an aircraft engine, a portion of the tailpipe outer wall, being broken away, and a vane outer edge being shown in broken lines.

Referring to the drawings in detail, tailpipe 10 for an aircraft jet engine, not shown, is designed in accordance with well known requirements for attaching co-axially and co-extensively onto the after end of the usual turbine casing of such engine. Since the general features of such tailpipes and the manner of mounting them on specific engines for which they are intended are well known, and are not per se part of the present invention, such details are omitted herein.

The tailpipe 10 has an outer wall 10a of suitable impervious material of required strength and lightness, such as sheet aluminum or other metal, and a porous inner wall 10b spaced inwardly therefrom to provide an annular inter-wall chamber 10c therebetween. This inter-wall chamber 10c is supplied with suitable coolant fluid through a duct fitting 11, which is mounted on and opens into the chamber 10c, and is adapted to be connected to a source of suitable coolant fluid, such as fan air from an engine on which the tailpipe is mounted or other suitable fluid pumped or ducted thereto at suitable pressure.

A plurality of double wall, hollow, helical vanes 12 are mounted to the duct inner wall 10b, as by welding, each vane tapering radially inwardly from a radially outward base of suitable width, to a narrow or even sharp inner edge 13. A plurality of holes 14, note the broken away portion of FIG. 1, are provided in the duct inner wall 10b along the path of the open base of each vane 12 to communicate the hollow interior 10c of the tailpipe with the hollow interior of each of the vanes 12.

Each vane 12 comprises spaced apart walls of porous material of suitable strength, porosity and heat resistance, such as, for example, felt metal, a multi-layer material known as Lamilloy, made and sold by Allison Engine Company, or material of the type disclosed in U. S. Pat. No. 3,507,355 and assigned to the assignee of the present invention.

Figure 2:
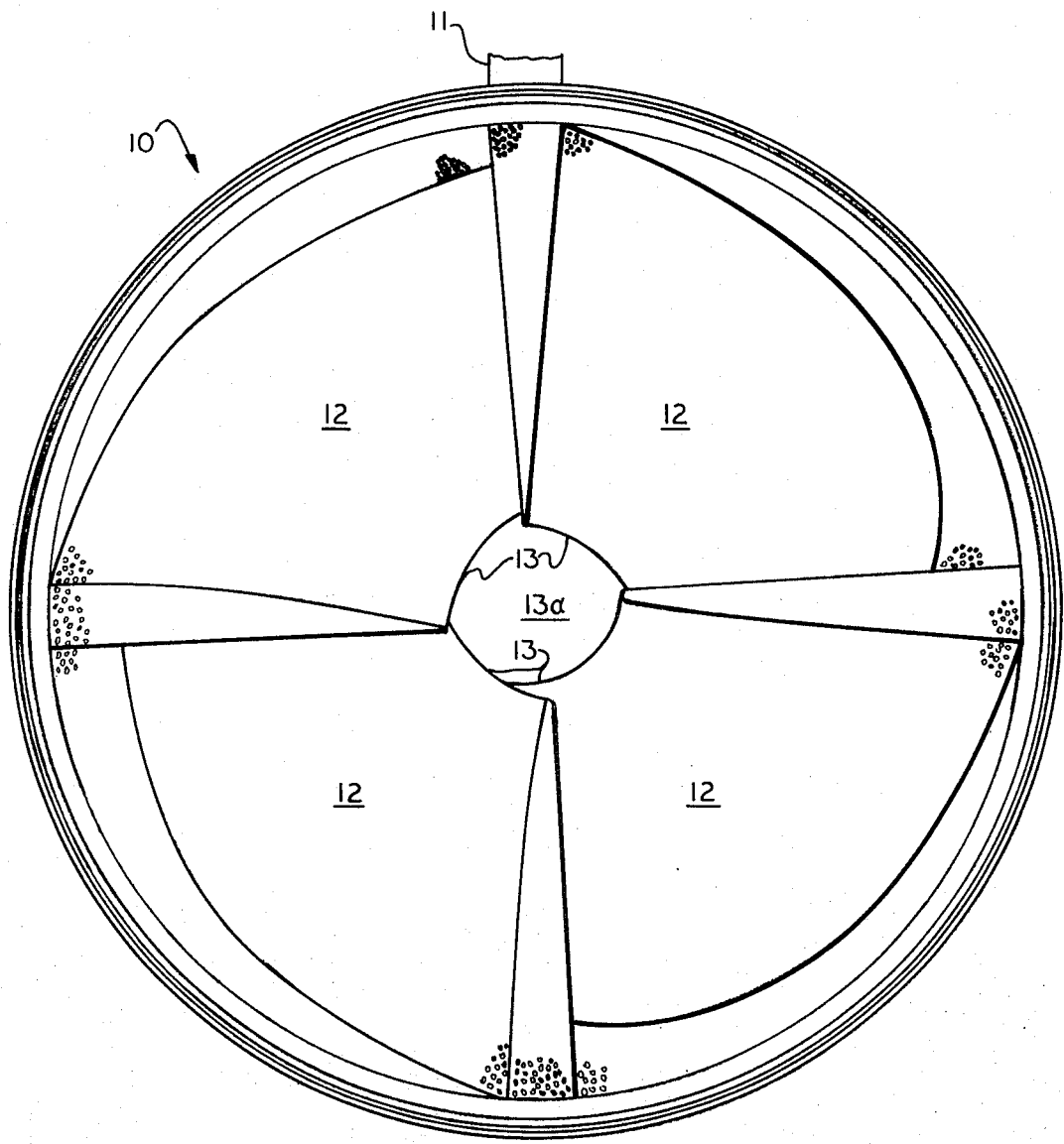
FIG. 2 is a rear end elevational view of the tailpipe shown in FIG. 1.
Figure 3:
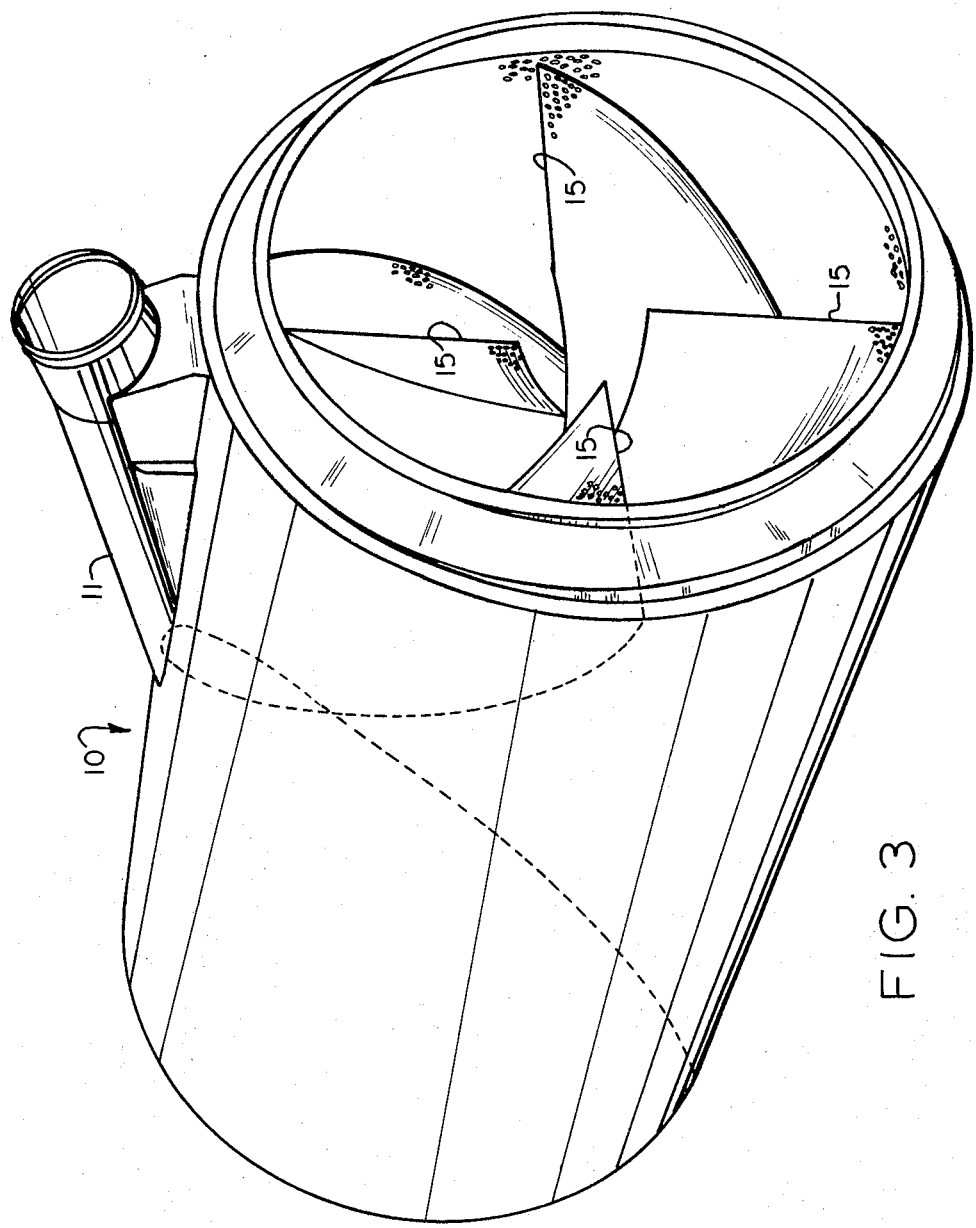
FIG. 3 is a perspective view looking into the forward end of the same tailpipe.

As shown in FIG. 1, the upstream or leading end of each vane 12 preferably is tapered to a streamlined entering edge 15, see FIG. 3, directed into the jet stream of engine gases discharged into the tailpipe 10 by an engine upon which the tailpipe 10 is mounted. The downstream or trailing end of each of these vanes may be either streamlined or squared off as desired. A squared off end structure is shown in FIG. 2, but the shape of the rear ends of the vanes does not materialy affect performance.

The number of vanes employed is not material to the invention, but four are presently preferred with each vane having a circumferential helical extent of 270°. In the illustrative example of the invention, the radially inward edge 13 of helical vane is co-axial with the tailpipe and its inner edge defines an axial opening 13a, see FIG. 2, of a diameter equal to that of a conventional bullet, not shown, on the after end of an engine for which the tailpipe is designed. Such bullet itself shields the central portion of the tailpipe from line-of-sight emission of infrared heat. In the event that a tailpipe embodying the invention is intended for use on an engine with no bullet, the vanes 12 may extend inwardly to the tailpipe axis.

OPERATION

In operation, the tailpipe 10 is mounted in a conventional manner on a jet aircraft engine, not shown, for which it is designed. The coolant fluid supply duct 11 is also connected to communicate with a source of selected coolant fluid under pressure greater than that existing within the tailpipe 10, such as, for example, fan air from the engine upon which the tailpipe is mounted, ambient atmospheric air at suitable pressure, other gas such as Freon, $CO_2$, hydrogen, etc., water vapor, airborne water spray, or other liquid or gas as may be available and desirable.

During operation of an engine upon which the tailpipe 10 is mounted, at least during such times as maximum heat shielding is required, the selected coolant fluid is fed at required pressure through the fluid inlet duct 11, and flows thence through the hollow interior 10c of the tailpipe, where a portion thereof transpires through the porous tailpipe inner wall 10b, and the remainder thereof flows through the holes 14 in the inner wall 10b into the vanes 12. This remainder of the coolant fluid transpires through the porous walls of the vanes 12.

As the coolant fluid seeps through the porous tailpipe inner wall and vane walls it is carried along with the hot gases of the jet exhaust stream of the engine upon which the tailpipe is mounted, exerting a three-way cooling effect by (1) transpiration cooling as it passes through the porous walls, (2) film cooling as it flows along the walls, and (3) convection cooling as it mixes with the exhaust gas stream.

In addition to the cooling effect this fluid has in reducing substantially the infrared signature of an engine upon which a tailpipe embodying the invention is mounted, the porous surfaces are effective in absorbing the noise of the turbine exhaust. In addition, the vanes, by imparting a helical twist to the engine jet exhaust gases, reduce the noise created by the shearing impact of the emerging jet exhaust stream on the ambient atmosphere.

The invention provides a tailpipe for a jet aircraft engine which reduces substantially the jet engine infrared heat signature by which an aircraft on which it is mounted may be detected and followed, and at the same time achieves desirable reduction in engine exhaust noise.

Having thus described my invention, what I claim as new and useful and desire to secure by U. S. Letters Patent is:

1. An infrared and sound suppressor for an aircraft jet engine having a turbine casing with annular aft end through which the turbine exhaust gases exit, said mechanism comprising a hollow wall tailpipe adated to be mounted co-axially and co-extensively on the aft end of the turbine casing of an engine for which the mechanism is designed, said tailpipe comprising an impervious outer wall and a porous inner wall spaced therefrom, a plurality of hollow, porous wall, helical vanes fitted co-axially in symmetrically spaced relation into the tailpipe and sealed thereto, each vane having an open, radially outward base communicating the hollow interior of each vane with the hollow interior of the tailpipe, a duct adapted to be connected with a supply of coolant fluid at a pressure greater than that within the tailpipe, and openly communicating with the hollow interior of the tailpipe, and thence with the hollow interiors of the vanes for transpiration of coolant fluid from the duct through, and flow along, the porous walls of the tailpipe and vanes into the interior of the tailpipe.

2. An infrared and sound suppressor as claimed in claim 1 wherein a plurality of spiral rows of holes are provided in the porous inner wall of the tailpipe, and the open base of each vane is fitted to cover one of such rows of holes to facilitate the flow of coolant fluid from the hollow interior of the tailpipe through such holes into the hollow interior of each of the vanes.

3. An infrared and sound suppressor as claimed in claim 1 wherein each helical vane has a circumferential extent greater than 180°.

4. An infrared and sound suppressor as claimed in claim 1 wherein each helical vane has a circumferential extent of the order of 240°.

5. An infrared and sound suppressor as claimed in claim 1 wherein the suppressor is designed for an engine provided with a conventional bullet mounted co-axially of the aft end of the turbine casing and the helical vanes of the suppressor terminate at their radially inward edges a radial distance from the axis of the tailpipe not greater than the radius of the bullet on such engine.

6. An infrared and sound suppressor as claimed in claim 1 wherein the radially inward edge of each helical vane terminates short of the axis of tailpipe to provide an open axial passage therethrough.

7. An infrared and sound suppressor as claimed in claim 6 wherein the radially inward edge of each helical vane is a relatively sharp edge.

8. An infrared and sound suppressor as claimed in claim 7 wherein the upstream edge of each helical vane is also sharpened.

* * * * *